Aug. 10, 1971  A. B. PIZZATO  3,598,539

VESSEL FOR CONTACTING FLUIDS AND A BED OF GRANULAR SOLIDS

Filed Dec. 11, 1968

INVENTOR:
Antonio Bruno Pizzato

BY: James R. Hoatson, Jr.
Philip T. Liggett
ATTORNEYS

United States Patent Office 3,598,539
Patented Aug. 10, 1971

3,598,539
VESSEL FOR CONTACTING FLUIDS AND A BED OF GRANULAR SOLIDS
Antonio B. Pizzato, Tokyo, Japan, assignor to Universal Oil Products Company, Des Plaines, Ill.
Filed Dec. 11, 1968, Ser. No. 783,026
Int. Cl. B01d 53/04; B01j 9/00, 9/04
U.S. Cl. 23—288
5 Claims

ABSTRACT OF THE DISCLOSURE

An improved vessel for contacting fluids and a bed of granular solids wherein the fluid passes through the aforesaid bed. A plurality of basket shaped screens are partially embedded in the aforesaid bed of granular solids. That portion of each screen having the greatest surface area is the portion most deeply embedded.

---

This invention relates to an improved vessel for contacting fluids and a bed of granular solids wherein the fluid passes through the aforesaid bed. More particularly, this invention is the improvement comprising a plurality of basket shaped screens partially embedded in the aforesaid granular solids, so that the portion of each screen having the greatest surface area is the portion most deeply embedded in the bed of granular solids.

Vessels for contacting a fluid and a bed of granulized solids are widely employed in the petroleum refining and chemical processing industries. Examples of applications include the contacting of gaseous, vaporized or mixed phase reactants with a solid particulate catalyst in such processes as naphtha reforming, hydrodesulfurization of naphthas, middle distillates and reduced crude, hydrogenation and hydrodealkylation of aromatic stocks, isomerization of normal paraffins, polymerization or hydrogenation of mono-olefins and olefins, fixed bed hydrocracking of heavy oils, etc. Other uses include the desiccant drying of wet gas streams and the separation of mixtures of compounds by selective sorption with molecular sieves.

The three basic designs of fixed bed contactors are upflow, radial flow and downflow. While upflow and downflow contactors perhaps enjoy the most widespread commercial usage for several reasons, both of these types of contactors suffer one substantial operational problem. This problem is that the catalyst bed, particularly the portion nearest the vessel inlet, is especially susceptible to plugging by rust, dust and other finely divided solid or semi-solid foreign material entrained in the incoming stream. Such foreign matter is introduced from one or more various sources and may comprise, for example, mill scale torn loose from plant equipment carried in with the incoming stream, metallic scale or dust formed as corrosion products, material pumped in with the fluid from storage tanks or other sources, or coke and polymers which may have been formed in the equipment such, as a heater, through which the contactor feed, or fluid is charged. Plugging of the catalyst bed, which occurs primarily in the top foot or so of ceramic spheres and catalyst at the fluid inlet, develops an excessive pressure drop through the bed, initially promotes channeling therethrough, and ultimately results in a shutdown of the contactor for the purpose of screening the catalyst. This plugging develops dead zones within the bed of granular solids, resulting in over-reaction of some portions of the reactant and under-reaction of others as well as a generally haphazard deactivation of various regions of the catalyst bed.

Numerous solutions have been advanced for alleviating the problem of plugging. Conventional basket shaped screens have been used with some degree of success as increasing the surface area of the interface between a bed of granular solid catalyst and a fluid stream at the fluid inlet to the aforesaid bed. This benefit is attainable with both the upflow and downflow fixed bed contactors. The conventional basket screens are not entirely satisfactory, however, in that they are constructed either having a uniform cross section throughout, or with the portion having the greatest surface area located nearest the interface between the bed of granular solids and the fluid entering the aforesaid bed. In addition, any particulate matter entering the reactor not only deposits on and in the upper portion of the bed but also in the baskets. Such a basket construction necessarily limits the available surface of contact between the fluids and granular solids. This limitation arises because the component of contact surface transverse to the direction of fluid flow is limited to the cross sectional area of the vessel. The only increase in surface contact area arises from the component of contact surface of the screen basket which is parallel to the general direction of fluid flow. This parallel component of contact surface is similarly limited by the depth of the bed of granular solids available for accommodating the conventional baskets.

It is a primary object of my invention to maximize the surface area of contact or interface, between a flowing fluid and a bed of granular solids in a vessel for contacting the aforesaid fluids and bed of granular solids. In this manner, the present improved vessel for contacting fluids with a bed of solids has all the advantages of the additional surface area afforded by vessels having multiple beds of contact, but with none of the attendant disadvantages of multiple screens traversing the vessel, such as increased vessel size, inaccessibility to the interior beds in the vessel, and other drawbacks.

It is a further object of this invention to provide an improved vessel for contacting a fluid with a bed of granular solids wherein the eventual clogging of the top bed of solids does not interfere with the unit operations in that it serves as an accumulation zone for the undesirable particulate matter. This results in a longer operating time before critical pressure differentials necessitate rendering the vessel temporarily inoperative for maintenance purposes.

Still another object of this invention is to provide an increased variety of paths of fluid flow by increasing the surface area of contact between the fluid and the bed of solids in order to reduce channeling within the bed. This results in more uniform contact of the fluid with the different parts of the bed of granular solids.

In a broad aspect this invention is, in a vessel for effecting contact between a fluid and a bed of granular solids by passing the fluid through the aforesaid bed, the improvement comprising a plurality of basket shaped screens partially embedded in the aforesaid bed of granular solids with that portion of each screen having the greatest surface area being most deeply embedded. The screen used to construct the aforesaid basket shaped screens may be of any mesh size small enough so that the pieces of granular solid do not flow into the baskets, but as large as possible so as to minimize and delay the formation of a pressure differential across the screen. The screens used need not be restricted to mesh screens but may be slotted screens as well. Slotted screens are screens having one or more openings of great length and narrow width. Slotted screens include screens formed by many longitudinal bars joined by a few transverse bars, cylindrical screens having one continuous slot formed by a single spiral member, screens having a plurality of slots formed by a single member which repeatedly reverses direction thereby forming a series of parallel lengths, and cylindrical screens formed from parallel circular hoops joined by transverse bars. The screens may be constructed of any conventional screening material depending upon the propensity toward chemical reaction of various screen materials with the granular solids.

The basket shaped screen may be of a variety of geometric shapes. One manner of construction is where each basket shaped screen is comprised of a first cylinder from one end of which a portion of screen extends and is joined to one end of a second cylinder of greater diameter than said first cylinder, the other end of said second cylinder being closed. As illustrated in FIG. 1, the first cylinder is more elongated and substantially vertically disposed, with the second cylinder and with reference to a line passing through the latter's diameter, lying laterally or crosswise within the bed. When this construction is used, it is frequently desirable that said portion of screen extending between said first and second cylinders is of a finer mesh than are said first and second cylinders. This latter modification will effectively prevent the smaller chips and particles of the granular solid from passing through the screen connecting the two cylinders thereby filling up the basket shaped screen with particles of the solid. There will be a greater tendency for particles to pass through the screen connecting the two cylinders because this connecting screen is transverse to the general direction of fluid flow. In a downflow vessel this tendency is reinforced by the gravitational forces on the particles of granular solid.

A further modification of this invention is characterized in that each of said basket shaped screens is further comprised of a hollow metal cylinder attached to the other end of said first cylinder. This metal cylinder may attach onto the other end of said first cylinder and extend toward the fluid inlet away from said basket shaped screen, or the metal cylinder may act as a sleeve over the outside or as a liner in the inside of the other end of said first cylinder. The cylinder may be co-extensive with said other end, or the metal cylinder may be partially co-extensive with and partially an extension of said first cylinder. This metal cylinder is useful where a protective layer, such as a layer of ceramic spheres, extends over the surface of a catalyst bed or other bed of granular solids to absorb foreign matter from the fluid stream. In this case the metal cylinder prevents such foreign matter as well as any crushed or broken pieces from the ceramic spheres from falling into the basket shaped screens.

In the preferred embodiment of this invention, the end portion of each basket shaped screen not embedded in the bed of granular solids is covered by a solid cap. The addition of a cap is particularly advantageous in a downflow vessel in that such a cap prevents the foreign material entering the vessel from flowing directly into the baskets, thereby plugging up the screen. Instead, this foreign material is forced into the exposed surface of the bed of granular solids or covering layer of ceramic spheres while the fluid, after depositing this foreign material, travels under the caps and into the baskets. This prevents the baskets from filling up with such foreign matter.

The features of this invention are further illustrated in the accompanying drawings in which.

Figure 1:
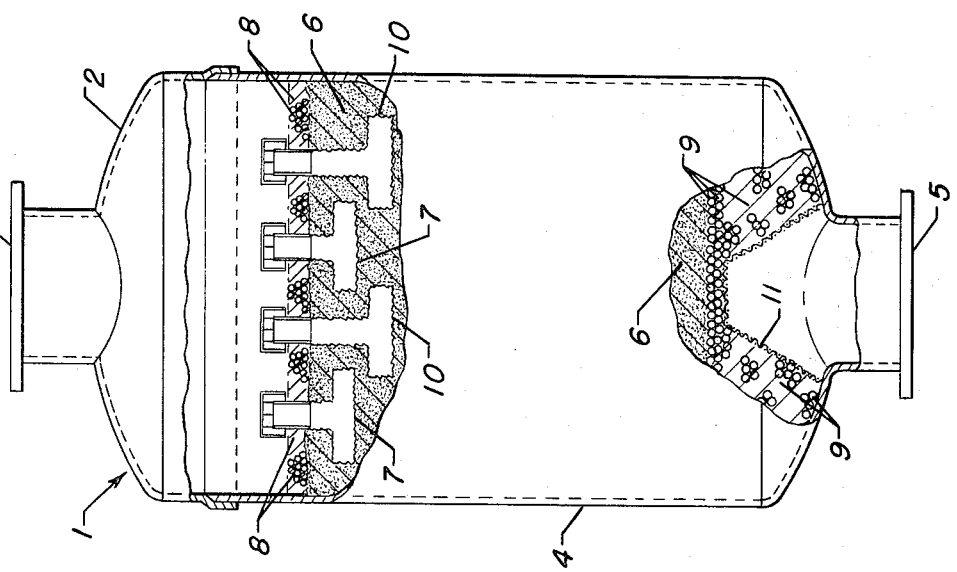
FIG. 1 is a partial sectional view of the preferred embodiment of this invention.

Referring now to FIG. 1, vessel 1 has an upper section 2 with a fluid inlet 3, and a lower section 4 with a fluid outlet 5. Within vessel 1 is a catalyst bed 6, which is a bed of granular solid catalyst supported at the bottom by a layer 9 of ceramic spheres which in turn is supported by a screen 11 mounted over fluid outlet 5. Embedded in catalyst bed 6 are a plurality of basket shaped screens 7 and basket shaped screens 10. These screens tend to be held in place by a covering layer 8 of ceramic spheres which extends across the cross-section of vessel 1 on top of catalyst bed 6. Such screens 7 and 10 are also held in place by the catalyst bed 6 as well as the layer 8 of ceramic spheres. Basket shaped screens 7 and 10 protrude above layer 8 toward inlet 3. Basket shaped screens 10 extend farther down towards outlet 5 than do baskets 7. The reason for this is to enable more basket shaped screens to be embedded in the catalyst bed 6 than would be possible were all the screens the same depth. Instead, shallow screens 7 are located between deeper screens 10 thereby further increasing the surface of contact of the fluid with catalyst bed 6.

When this vessel is used to remove sulfur, nitrogen, oxygen and other contaminants from a stream of naphtha and hydrogen, the naphtha containing hydrogen enters vessel 1 through inlet 3. The gas stream then strikes either the caps of the basket shaped screens 7 or passes through ceramic sphere layer 8 and contacts catalyst bed 6. The major portion of any solid contaminants are left deposited upon the surface of or embedded in the top portion of the ceramic sphere layer 8. The hydrogen, naphtha, and fluid impurities then reverse direction of flow in order to flow up underneath the caps of screens 7 and 10 down into basket shaped screens 7 and 10. The fluids flow through the mesh openings in the various surfaces of screens 7 and 10 into catalyst bed 6, where the various fluid impurities are reacted with hydrogen to form hydrogen sulfide, ammonia, water vapor and possibly other fluids or gases, all of which are separated from the naphtha stream, after flowing through ceramic sphere bed 9 and out fluid outlet 5.

Figure 2:
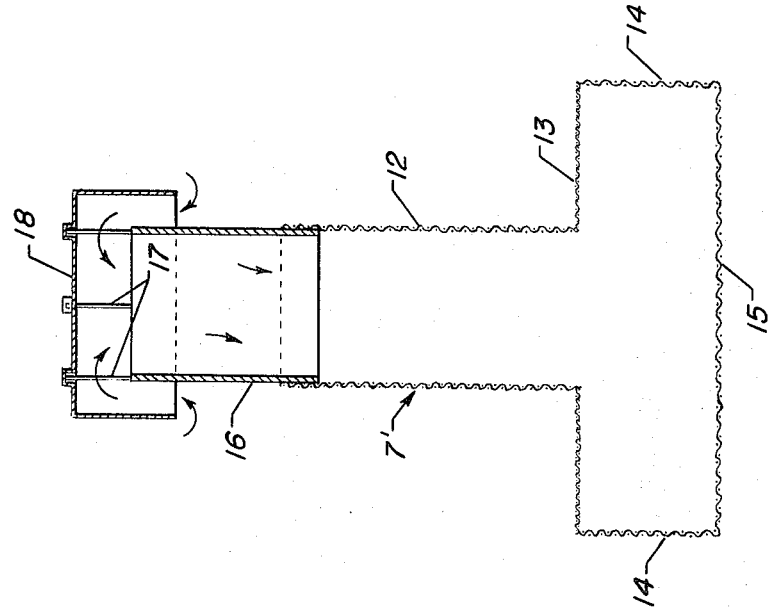
FIG. 2 is a sectional elevational view of the preferred embodiment of the basket shaped screen of this invention.

A more detailed embodiment of the basket shaped screen of this invention is illustrated in FIG. 2. Referring now to FIG. 2 there is shown a basket shaped screen 7' comprised of a first cylinder 12 from one end of which a portion of screen 13 extends and is joined to one end of a second cylinder 14. Cylinder 14 is of a greater diameter than cylinder 12. The other end of cylinder 14 is closed and is comprised of a screen portion 15 having an 8 x 8 mesh. Cylinder 12 and cylinder 14 are also comprised of 8 x 8 mesh screen, but screen portion 13 extending between cylinder 12 and cylinder 14 is a screen having a 20 x 20 mesh. Screen 13 is attached to cylinder 14 and cylinder 12 by intertwining the adjacent ends of cut wires of the adjoining screens. Screen 7' is further comprised of a hollow metal cylinder 16 which slips into and is partially co-extensive with the other end of cylinder 12. Extending from the upper end of metal cylinder 16 are several wires 17 to which is fastened a solid metal cap 18 a short distance away from metal cylinder 16. The edges of metal cap 18 extend down below the upper end of metal cylinder 16 so that to enter basket shaped 7', fluid must first pass down below the level of metal cap 18, back up over the upper edges of metal cylinder 16, and down through metal cylinder 16, passing through the screen walls of basket shaped screen 7' into the adjacent catalyst bed. Metal cylinder 16, wires 17, and cap 18 are all part of a single structure which is friction fitted into and easily removable from the screen portion of basket-shaped screen 7' to allow basket-shaped screen 7' to be cleaned.

The drawings illustrate the preferred embodiments of the improved contacting vessel of this invention. The embodiments of the basket shaped screens and contacting vessel illustrated shall not be construed as limiting this invention thereto, as there are almost any number of uses and variations in the construction of this invention and its application to fixed bed contactors. Nothing herein shall be construed as limiting this invention as to the screen, slot or mesh sizes, the use of the improved vessel, nor the geometric construction as long as that portion of each basket shaped screen having the greatest surface area is the portion of basket shaped screen most deeply embedded in the bed of granular solids.

I claim:

1. In a vessel for effecting contact between a fluid and a bed of granular solids by passing fluid through said bed, the improvement comprising a plurality of cylindrically-shaped screens imbedded in said bed, each of said screens having the configuration of an upper elongated first screen cylinder, said first cylinder being substantially vertically disposed with respect to said bed, and a second screen cylinder joined to said first screen cylinder by a screen, said second cylinder having a diameter substantially greater than its height and then the diameter of said first cylinder, said second cylinder having a second bottom, said second cylinder with respect to its diameter lying laterally across said bed and being disposed below said first cylinder to thereby more deeply imbed said second cylinder in said bed, said second cylinder being closed at its lower end by said screen bottom and having a larger surface and contact area than said first cylinder.

2. The improved vessel of claim 1 further characterized in that the second cylinders of some of the said screens are more deeply imbedded in said bed of granular materials than other of said second cylinders, thereby enabling more of said screens to be imbedded in said bed.

3. The improved vessel of claim 1 further characterized in that said screen joining said first and second cylinders is of finer mesh than the screens of said first and second cylinders.

4. The improved vessel of claim 1 further characterized in that a hollow metal cylinder is attached to the upper end of said first screen cylinder and extends above said bed.

5. The improved vessel of claim 4 further characterized in that the upper end of said hollow metal cylinder is covered by a solid cap.

References Cited

UNITED STATES PATENTS

| | | | |
|---|---|---|---|
| 2,961,304 | 11/1960 | Collins | 23—288 |
| 3,006,740 | 10/1961 | Maggio | 23—288 |
| 3,051,561 | 8/1962 | Grimes | 23—288 |
| 3,112,256 | 11/1963 | Young et al. | 23—288X |
| 3,146,189 | 8/1964 | Kunreuther et al. | 23—288X |
| 3,255,159 | 6/1966 | Frandsen | 23—288 |
| 3,431,084 | 3/1969 | Forbes | 23—288 |
| 3,469,950 | 9/1969 | Mackley | 23—288 |

JOSEPH SCOVRONEK, Primary Examiner

U.S. Cl. X.R.

23—284, 285; 55—389; 208—146; 210—279; 261—97